United States Patent
An

(10) Patent No.: US 7,352,395 B2
(45) Date of Patent: Apr. 1, 2008

(54) DEFECT PIXEL REPAIRABLE IMAGE SENSOR

(75) Inventor: Hyun-Joo An, Ichon-shi (KR)

(73) Assignee: Magnachip Semiconductor, Ltd., Cheongju (KR)

( * ) Notice: Subject to any disclaimer, the term of this patent is extended or adjusted under 35 U.S.C. 154(b) by 753 days.

(21) Appl. No.: 10/748,643

(22) Filed: Dec. 29, 2003

(65) Prior Publication Data

US 2004/0165089 A1    Aug. 26, 2004

(30) Foreign Application Priority Data

Feb. 24, 2003    (KR) ...................... 10-2003-0011468

(51) Int. Cl.
*H04N 9/64* (2006.01)
(52) U.S. Cl. ..................................... 348/247
(58) Field of Classification Search ........... 348/207.99, 348/246, 247
See application file for complete search history.

(56) References Cited

U.S. PATENT DOCUMENTS

| | | | |
|---|---|---|---|
| 5,392,070 A * | 2/1995 | Endo et al. ................ | 348/247 |
| 6,002,433 A * | 12/1999 | Watanabe et al. .......... | 348/246 |
| 6,642,960 B1 * | 11/2003 | Kohashi et al. ............ | 348/246 |
| 6,683,643 B1 * | 1/2004 | Takayama et al. .......... | 348/247 |
| 2003/0007081 A1 | 1/2003 | Kwon et al. | |
| 2003/0063202 A1 * | 4/2003 | Toyoda et al. ............. | 348/246 |
| 2004/0036783 A1 * | 2/2004 | Barna ........................ | 348/300 |
| 2004/0169746 A1 * | 9/2004 | Chen et al. ................. | 348/246 |

FOREIGN PATENT DOCUMENTS

JP    2003-101885    4/2003

* cited by examiner

*Primary Examiner*—Ngoc-Yen Vu
*Assistant Examiner*—John Morehead
(74) *Attorney, Agent, or Firm*—Blakely, Sokoloff, Taylor & Zafman LLP

(57) ABSTRACT

An image sensor includes a storage block for storing a plurality of pixel data which is transmitted from a pixel array block; a switching block for delivering a first pixel data from the storage block in response to a first control signal; a defect pixel repairing block which is controlled by the first to fifth control signals PASS, DPCA, MS, ISCA and Line End in order to receive surrounding pixel data having the first pixel data from the storage block and the first pixel data from the switching block and output a revised pixel data by using the first pixel data or the surrounding pixel data; and a image signal handling block for receiving the first pixel data outputted from the switching block or the revised pixel data outputted from the defect pixel repairing block and operating an image process in order to improvement of the image sensor.

12 Claims, 7 Drawing Sheets

FIG. 7A

| MS1 | MS1 | DPCA DETECTING SIGNAL | U | DPCA CONTROL SIGNAL |
|---|---|---|---|---|
| X | X | 0 | 0 (HOLD) | 0 (HOLD) |
| 0 | 0 | 1 | 0 (HOLD) | 0 (HOLD) |
| 0 | 1 | 1 | 0 (HOLD) | |
| 1 | 0 | 1 | 1 (UPDATE) | 1 (UPDATE) |
| 1 | 1 | 1 | 1 (UPDATE) | |

FIG. 7B

| LINE END | U | DPCA CONTROL SIGNAL |
|---|---|---|
| 1 | 0 | 1 (UPDATE) |
| | 1 | 0 (HOLD) |

DEFECT PIXEL REPAIRABLE IMAGE SENSOR

FIELD OF INVENTION

The present invention relates to an image sensor; and, more particularly, to a repair technique for revising a defect pixel of the image sensor detected by a test.

DESCRIPTION OF PRIOR ART

An image sensor is a device for picking up light images by using a semiconductor property to react to the light. Namely, the image sensor is a device whose pixels detect different brightness and wavelengths of the light which is reflected from each object and which converts those detected values into corresponding electrical values. The image sensor changes the electric values into voltage levels to which signal processing can be performed. Recently, VGA (640×480 pixels) and SVGA (800×600 pixels) have been mainly used in image sensors. As digital still cameras come into universal use, an image sensor of a mega-pixel level (having more than one million pixels) will be commonly used. Therefore, in the future, the image sensor having at least one million pixels may be usually used because a digital still camera becomes an ordinary device. Thus, a technology for the image sensor having over mega-pixel is necessary to secure a market of a next generation image sensor.

Meanwhile, as the number of pixels in the image sensor increases, the number of defective pixels, which are generated by the difficulty in a fabricating process, also increases. The defective pixels should be repaired to reduce the fabricating cost and to increase the yield.

A grade of the image sensor and a price thereof are determined according to the number of the defective pixels and, if image sensors include the defective pixels without being repaired, the fabricating cost of the image sensor is increased because the yield is decreased.

In order to solve the above problem, a product employing the image sensor chip having one or more defective pixels, such as the digital still camera or the like, is provided with a post test method. The post test method includes the step of testing each pixel; recording addresses of the defective pixels in an EEPROM; and then compensating data corresponding to the defective pixels, so that the image sensor having the defective pixels can be used in the product as a normal image sensor.

However, since this test is carried out separately from a test in a wafer-level test, a period of developing a product employing the image sensor is increased. Also, since the EEPROM has to be additionally embedded in the product, a size of the product becomes bigger and its manufacturing cost will be increased.

On the other hand, in case a manufacturer of the image sensor chip directly detects defective pixels through the wafer-level test and records the addresses of the defective pixels and then packages the EEPROM with the image sensor, the product developing can be shortened because a company can use the image sensor chip without an additional post pixel test. However, since it is required to perform an extra process for fabricating the EEPROM in addition to the image sensor fabricating process, the fabricating process of the image sensor becomes complicated and its fabrication cost is increased.

For resolving this problem, an image sensor employing a fuse blowing technique is disclosed in a commonly owned copending application, U.S. Ser. No. 10/189,942, filed on Jul. 3, 2002, entitled "IMAGE SENSOR WITH DEFECT PIXEL ADDRESS STORAGE".

FIG. 1 is a block diagram of a conventional image sensor capable of storing addresses of defective pixels by using the fuse blowing technique.

As shown, the image sensor includes a pixel array 100, a line buffer 200, an image signal processing unit 300, a defective pixel address storing unit 500, a control and interface unit 400 and a defective pixel compensation unit 600.

The line buffer 200 stores data transmitted from the pixel array 100 and the image signal processing unit 300 performs a signal processing to improve the performance of the image sensor in response to outputs of the line buffer 200. The defective pixel address storing unit 500 stores addresses of defective pixels, which are detected from a wafer level test, by using the fuse blowing technology. The control and interface unit 400 receives the address information of the defective pixels from the defective pixel address storing unit 500 and controls the whole operation of the image sensor. Also, the control and interface unit 400 manages an interface with an external system. The defective pixel compensation unit 600 receives the address information of the defective pixels from the defective pixel address storing unit 500, control signals from the control and interface unit 400 and pixel data from the line buffer 200. Therefore, the defective pixel compensation unit 600 compensates the data of the defective pixels by replacing the defective pixel data with normal pixel data around the defective pixels and outputs the replaced pixel data to the image signal processing unit 300.

In FIG. 1, the defective pixel address storing unit 500 includes a row address selection block 510, a column address storage block 520 and a selection bit block 530. The row address selection block 510 stores information for whether or not defect pixels exist for each row of the pixel array 100 by on/off of fuse therein and outputs a row address selection signal RASS to the control and interface unit 400. The column address storage block 520 stores information for column addresses of the defective pixels and outputs a column address signal CAS to the defective pixel compensation unit 600. The selection bit block 530 stores information for correctly matching information stored in the row address selection block 510 and the column address storage block 520 and outputs a matching signal to the control and interface unit 400.

However, there is needed a more efficient circuit for implementing the detective pixel compensation unit 600.

SUMMARY OF INVENTION

It is, therefore, an object of the present invention to provide a circuit and method capable of implementing the detective pixel compensation unit.

In accordance with an aspect of the present invention, there is provided an image sensor including a storage block for storing a plurality of pixel data which is transmitted from a pixel array block; a switching block for delivering a first pixel data from the storage block in response to a first control signal PASS; a defect pixel repairing block which is controlled by the first, a second, a third, a forth and a fifth control signals PASS, DPCA, MS, ISCA and Line End in order to receive surrounding pixel data having the first pixel data from the storage block and the first pixel data from the switching block and output a revised pixel data by using the first pixel data or the surrounding pixel data; and a image signal handling block for receiving the first pixel data outputted from the switching block or the revised pixel data outputted from the defect pixel repairing block and operating an image process in order to improvement of the image sensor.

BRIEF DESCRIPTION OF THE DRAWINGS

The above and other objects and features of the instant invention will become apparent from the following description of preferred embodiments taken in conjunction with the accompanying drawings, in which:

FIGS. 7A and 7B are tables depicting a DPCA updating signal changed in response to a current matching signal MS1 and a next matching signal MS2 which are inputted to the DPCA controlling unit 630.

DETAILED DESCRIPTION OF THE INVENTION

Hereinafter, an inventive apparatus and method for repairing and compensating a pixel data of a defect pixel by repair operation using stored address of a defect pixel in an image sensor will be described in detail with reference to the accompanying drawings.

Figure 1:
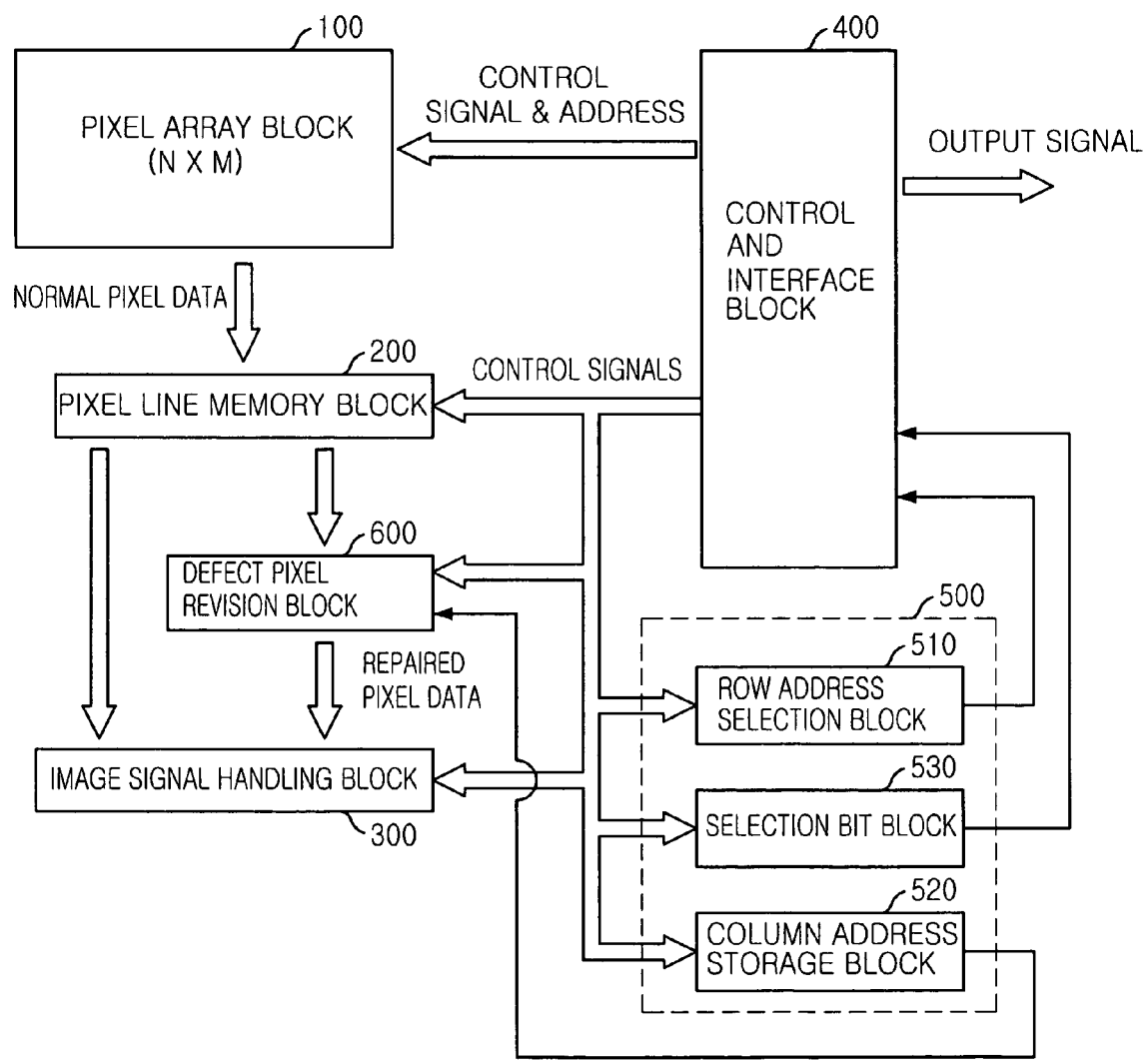
FIG. 1 is a block diagram describing a conventional image sensor.
Figure 2:
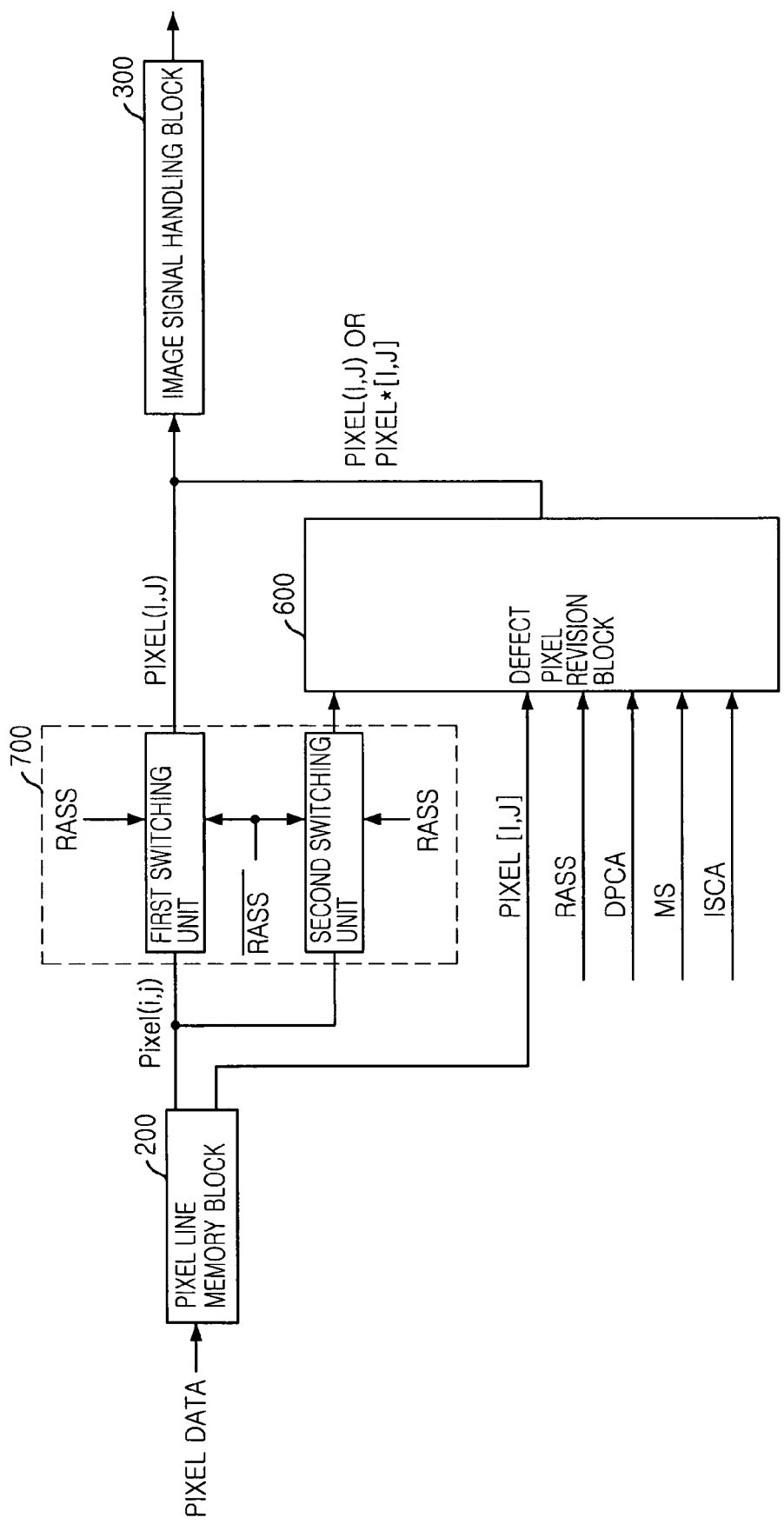
FIG. 2 is a block diagram describing a defect pixel compensation block and its surrounding blocks included in the image sensor shown in FIG. 1.

FIG. 2 is a block diagram describing a defect pixel revision unit included in the image sensor shown in FIG. 1.

As shown, the defect pixel revision unit includes a switching block 700 and a defect pixel compensation block 600. More particularly, there is described a control signal flow around the defect pixel compensation block 600. The defect pixel compensation block 600 is for repairing and compensating the pixel data of the defect pixels by using an address of the defect pixel which is stored in a defect pixel address storage block 500 by fuse blowing technology.

In an image sensor disclosed in a commonly owned copending application, U.S. Ser. No. 10/189,942, filed on Jul. 3, 2002 and entitled "IMAGE SENSOR WITH DEFECT PIXEL ADDRESS STORAGE", the control signals shown in FIGS. 1 and 2, i.e., RASS, DPCA, MS and the like are already described in detail. So, description about the control signals RASS, DPCA and MS is omitted and, herein, there is described how to repair and compensate pixel data of defect pixels.

Referring to FIG. 2, an image sensor in accordance with the present invention further includes the switching block 700. The switching block 700 is controlled by a defect pixel column address selecting signal RASS, i.e., the RASS is generated from the column address selecting block 510 included in the defect pixel address storage block 500 and inputted through the control and interface block 400, for transmitting a pixel data PIXEL(i,j) outputted from the pixel line memory block 200 in response to an current address.

In addition, the image sensor in accordance with the present invention further includes a defect pixel compensation block 600 for receiving surrounding pixel data PIXEL [I,J] having the pixel data PIXEL(i,j) from the pixel line memory block 200 and the pixel data PIXEL(i,j) from the switching block 700 and outputting a revised pixel data PIXEL*(i,j) by using the pixel data PIXEL(i,j) or the surrounding pixel data PIXEL[I,J].

Herein, the image sensor in accordance with the present invention has several control signals, i.e., RASS, DPCA, MS, ISCA and LINE-END. A defect pixel column address DPCA is outputted from a column address storage block 520. An image sensor column address ISCA is a column address signal which is serially supplied in a chip. A matching signal MS is generated by a selecting bit block 530 and inputted through the control and interface block 400. A last column signal LINE-END is usually in logical '0' but, only at the last column in each row, in logical '1'.

In addition, the image sensor in accordance with the present invention further includes the image signal handling block 300 for receiving the pixel data PIXEL(i,j) outputted from the switching block 700 or one of the pixel data PIXEL(i,j) and the revised pixel data PIXEL*(i,j) outputted from the defect pixel compensation block 600 and operating an image process in order to improvement of the image sensor.

Hereinafter, the switching block 700 is described in detail. The switching block 700 includes a first switching unit SW1 controlled by the defect pixel column address selecting signal RASS and the inverse defect pixel column address selecting signal /RASS in order to transmit the pixel data PIXEL(i,j) to the image signal handling block 300 and a second switching unit SW2 controlled by the defect pixel column address selecting signal RASS and the inverse defect pixel column address selecting signal /RASS in order to transmit the pixel data PIXEL(i,j) to the defect pixel compensation block 600. The first and second switching blocks SW1 and SW2 respectively have a transmission gate which is composed of a pair of NMOS transistor and PMOS transistor.

Thus, if there is the defect pixel at a line in the image sensor, i.e., the RASS is in logical '1', the first switching unit SW1 is off and the second switching unit SW2 is on. As a result, the revised pixel data PIXEL*(i,j) outputted from the defect pixel compensation block 600 is inputted to the image signal handling block 300.

Figure 3:
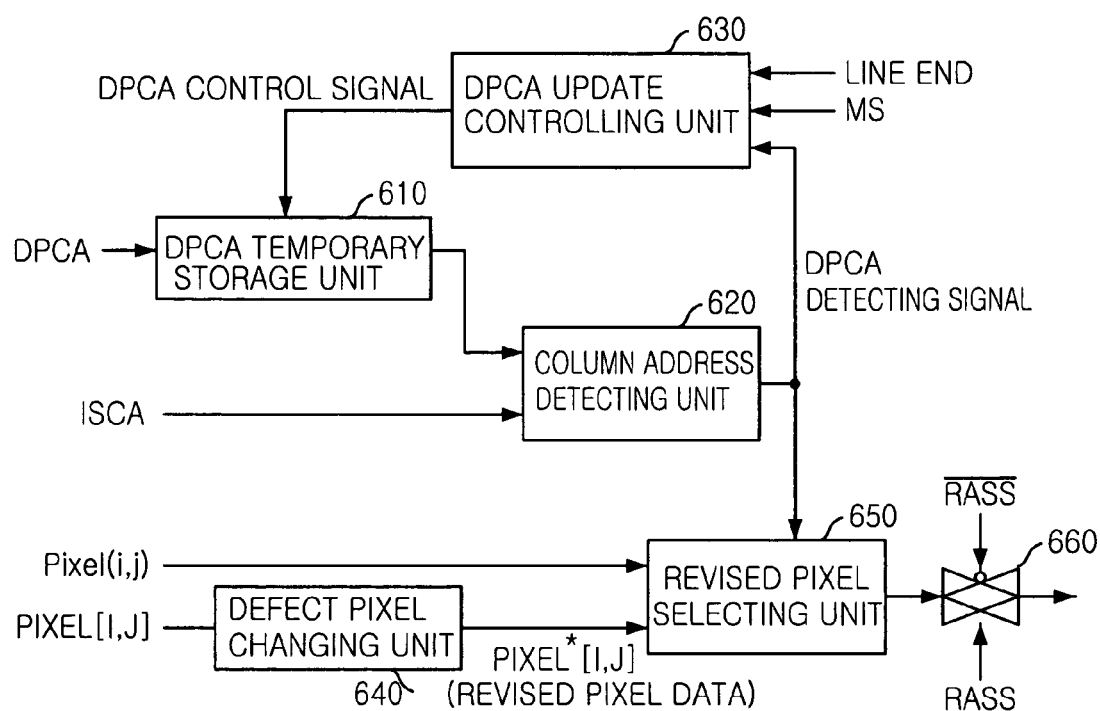
FIG. 3 is a block diagram showing the defect pixel compensation block in detail.

FIG. 3 is a block diagram showing the defect pixel compensation block 600 in detail.

As shown, the defect pixel compensation block 600 of the image sensor in accordance with the present invention includes a DPCA temporary storage unit 610 for temporary storing the defect pixel column address DPCA, a column address detecting unit 620 for comparing the defect pixel column address DPCA outputted from the DPCA temporary storage unit with the image sensor column address ISCA and generating a DPCA detecting signal showing whether or not the defect pixel column address DPCA is equal to the image sensor column address ISCA, a DPCA controlling unit 630 for outputting an next defect pixel column address DPCA to the DPCA temporary storage unit 610 in response to the DPCA detecting signal, the matching signal MS and the last column signal LINE-END, a defect pixel changing unit 640 for receiving the surrounding pixel data PIXEL[I,J] and generating the revised pixel data PIXEL*(i,j), a revised pixel selecting unit 650 for selectively outputting the revised pixel data PIXEL*(i,j) or the pixel data PIXEL(i,j) in response to the DPCA detecting signal, and a switch outputting unit 660 controlled by the defect pixel column address selecting signal RASS in order to selectively output an output of the revised pixel selecting unit 650.

Hereinafter, the defect pixel compensation block 600 is depicted in detail.

If the defect pixel column address selecting signal RASS is in logical '1', i.e., there is a defect pixel at a row, the column address detecting unit 620 compares the image sensor column address ISCA which is serially outputted from the control and interface block 400 with the defect pixel column address DPCA which is already stored in the DPCA temporary storage unit 610. If the ISCA is same to the DPCA, the DPCA detecting signal is in logical '1'. Otherwise, the DPCA detecting signal is in logical '0'.

In case when the DPCA detecting signal is in logical '0', there is not any defect pixel at that row. So, the revised pixel selecting unit 650 outputs the pixel data PIXEL(i,j) outputted from the pixel line memory block 200. However, if the DPCA detecting signal is in logical '1', there is defect pixel at that row. Thus, the revised pixel selecting unit 650 outputs the revised pixel data PIXEL*(i,j) outputted from the defect pixel changing unit 640.

Figure 4:
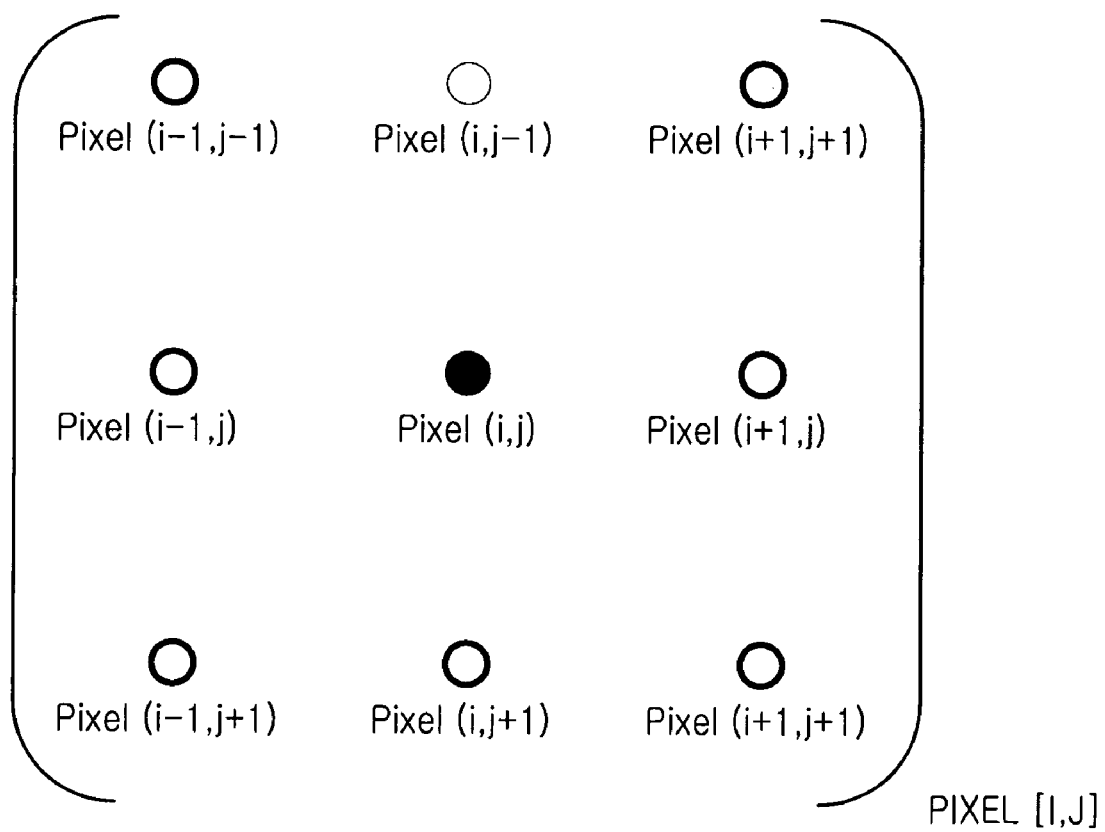
FIG. 4 is an example describing surrounding pixel data having the pixel data.

FIG. 4 describes the surrounding pixel data PIXEL[I,J] having the pixel data PIXEL(i,j).

Herein, referring to FIG. 4, operation of the defect pixel changing unit 640 is described in detail. It is assumed that the surrounding pixel data PIXEL[I,J] includes eight pixel data PIXEL(i−1,j−1) to PIXEL(i+1,j+1) except the pixel data PIXEL(i,j). There are several methods of generating the revised pixel data PIXEL*(i,j). For instance, one is a way using average of the eight pixel data PIXEL(i−1,j−1) to PIXEL(i+1,j+1), and another is to substitute the pixel data PIXEL(i,j) with one of the eight pixel data PIXEL(i−1,j−1) to PIXEL(i+1,j+1). Structure of the defect pixel changing unit 640 can be changed in response to how to generate the revised pixel data PIXEL*(i,j).

Figure 5:
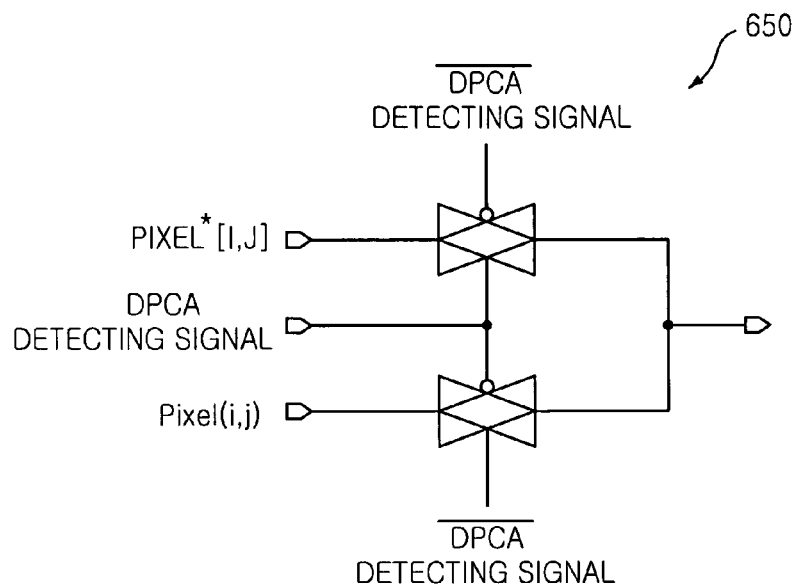
FIG. 5 is a circuit diagram showing a revised pixel selecting unit 650.

FIG. 5 is a circuit diagram showing the revised pixel selecting unit 650. The revised pixel selecting unit 650 includes two transmission gates controlled by both the DPCA detecting signal and the inverse DPCA detecting signal for selectively delivering either the pixel data PIXEL (i,j) or the revised pixel data PIXEL*(i,j).

Figure 6:
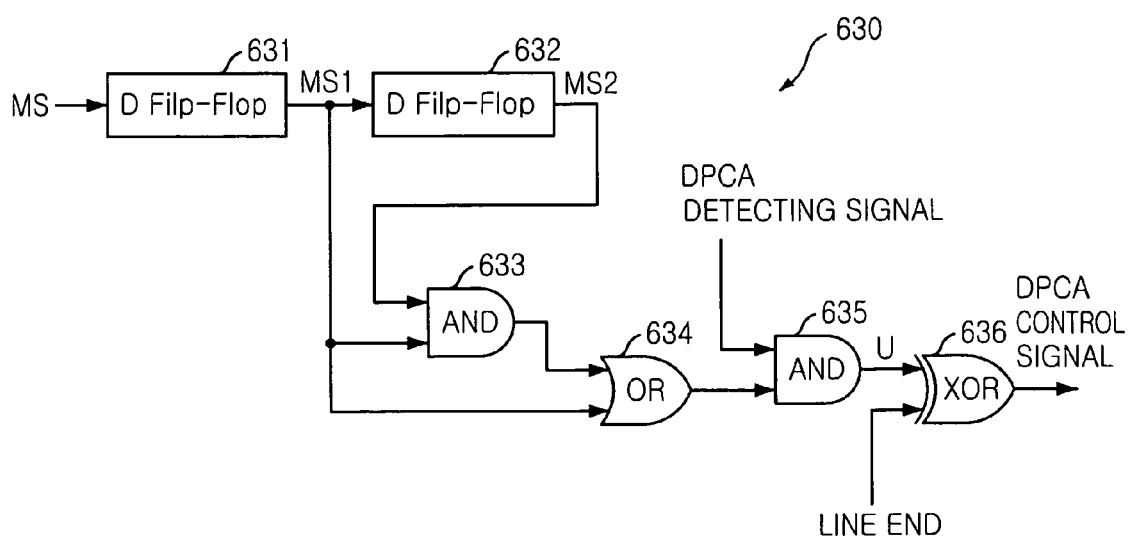
FIG. 6 is a circuit diagram showing a DPCA controlling unit 630.

FIG. 6 is a circuit diagram showing the DPCA controlling unit 630. The DPCA controlling unit 630 includes a first D flip-flop 631 for receiving the matching signal MS and outputting a current matching signal MS1, a second D flip-flop 632 for receiving the current matching signal MS1 and outputting a next matching signal MS2, a first AND gate 633 for receiving the current matching signal MS1 and the next matching signal MS2, an OR gate 634 for receiving the current matching signal MS1 and an output of the first AND gate, a second AND gate 635 for receiving the DPCA detecting signal and an output of the OR gate, and a XOR gate 636 for receiving the last column signal LINE-END and an output of the second AND gate 635 and outputting an DPCA control signal for updating the defect pixel column address DPCA.

As above statement, the DPCA controlling unit 630 includes the first and second D flip-flops 631 and 632 for storing the current value and next value of the matching signal MS1 and MS2. There is a reason that condition of updating the defect pixel column address DPCA stored in the DPCA temporary storage unit 610 is changed in response to the current value and next value of the matching signal MS1 and MS2.

FIGS. 7A and 7B are tables depicting the DPCA control signal changed in response to the current matching signal MS1 and the next matching signal MS2 which are inputted to the DPCA controlling unit 630.

FIG. 7A shows the DPCA control signal if the last column signal LINE-END is in logical '0'. In this case, if the DPCA detecting signal is in logical '0', the DPCA control signal outputted from the DPCA controlling unit 630 is hold. Namely, in case when, in the column address detecting unit 620, the DPCA is not equal to the ISCA, the DPCA control signal is in logical '0' and, unrelated to matching signals MS1 and MS2, the defect pixel column address DPCA of the DPCA temporary storage unit 610 is not changed. Otherwise, in case when the DPCA detecting signal is in logical '1', the DPCA control signal is in logical '1' if the matching signals (MS1, MS2) are (1,0) or (1,1). As a result, the defect pixel column address DPCA of the DPCA temporary storage unit 610 is changed. However, in this case, i.e., the DPCA detecting signal is in logical '1', the defect pixel column address DPCA of the DPCA temporary storage unit 610 is not changed if the matching signals (MS1, MS2) are (0,0) or (0,1).

If the matching signals (MS1, MS2) are (0,0) or (0,1), it means that there is just one defect pixel at a row or the last pixel at the row is a defect pixel. At this time, if the defect pixel column address DPCA of the DPCA temporary storage unit 610 is changed by making the DPCA control signal is in logical '1', it can be occurred that normal pixel is repaired and compensated. So, for preventing mal-operation that normal pixel is repaired and compensated, the DPCA control signal keeps in logical '0'.

FIG. 7B shows the DPCA updating signal if the last column signal LINE-END is in logical '1'. As shown, in case when the last column signal LINE-END is in logical '1', the DPCA control signal is in logical '1' if U node shown in FIG. 6 is in logical '1'. So, the defect pixel column address DPCA of the DPCA temporary storage unit 610 is changed. Otherwise, if U node shown in FIG. 6 is in logical '1' and the prior last column signal LINE-END is in logical '0', the DPCA control signal keeps in logical '0' because the defect pixel column address DPCA is updated without any delay.

Figure 8:
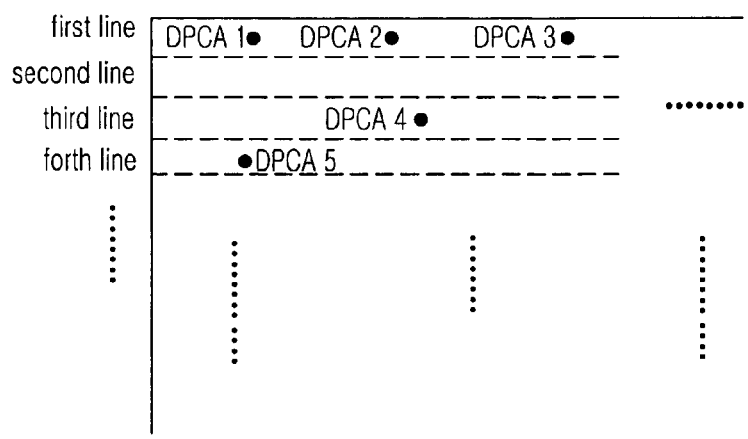
FIGS. 8 and 9 are timing diagrams showing operation of the image sensor having a defect pixel.
Figure 9:
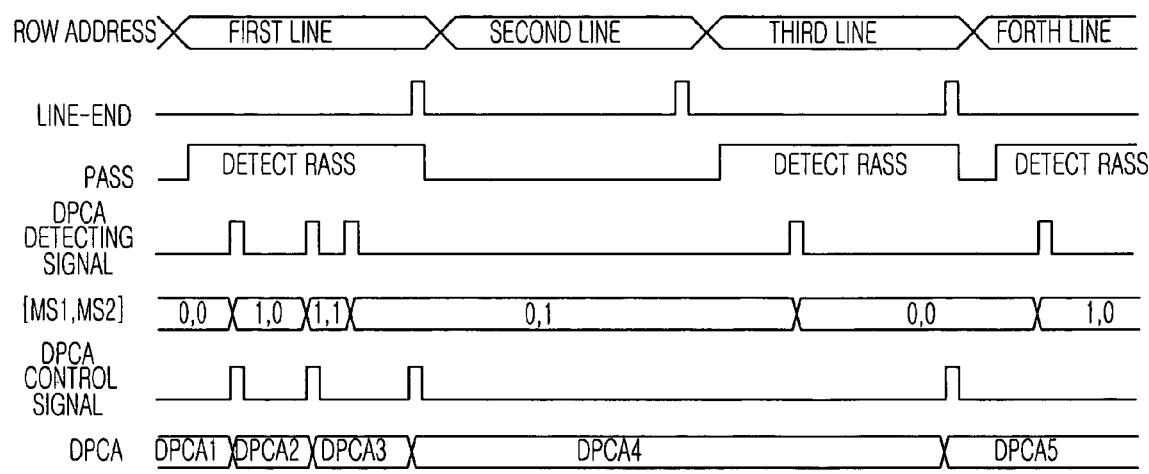

FIGS. 8 and 9 are timing diagrams showing operation of the image sensor having a defect pixel.

Referring to FIGS. 8 and 9, in a first, a third and a forth rows where the defect pixel exists, the defect pixel column address selecting signal RASS is in logical high and the prior last column signal LINE-END is in logical high at the last column in each line. The DPCA1, DPCA2 and DPCA3 existed in the first line is compensated to make the DPCA detecting signal outputted from the column address detecting unit 620 in logical high. At this time, at the DPCA1 and DPCA2, the DPCA detecting signal and the DPCA control signal are in logical high.

However, at the DPCA3, i.e., the last defect pixel in the first row, the DPCA detecting signal is in logical high but the DPCA control signal keeps in logical low until the last column signal LINE-END is in logical high at the last column in the first line. Then, if the last column signal LINE-END is in logical high, the DPCA control signal in response to the DPCA3 is changed in logical high.

As good as the DPCA3, the DPCA control signals in response to the DPCA4 in the third line and the DPCA5 in the forth line are in logical high if the last column signal LINE-END is in logical high.

The image sensor in accordance with the present invention does not need an additional EEPROM for storing addresses of defect pixels because the addresses of defect pixels are stored by the fuse blowing technology and the stored addresses are used for compensating pixel data of the defect pixels. As a result, the present invention can reduce purchasing cost of the image sensor because of increasing a factional yield of fabricating the image sensor.

While the present invention has been described with respect to the particular embodiments, it will be apparent to those skilled in the art that various changes and modifications may be made without departing from the spirit and scope of the invention as defined in the following claims.

What is claimed is:

1. An image sensor, comprising:
   a storage means for storing a plurality of pixel data which is transmitted from a pixel array block;
   a switching means for delivering a first pixel data from the storage means in response to a first control signal RASS;
   a defect pixel repairing means which is controlled by the first, a second, a third, a fourth and a fifth control signals in order to receive surrounding pixel data having the first pixel data from the storage means and the first pixel data from the switching means and output a revised pixel data by using the first pixel data or the surrounding pixel data; and
   a image signal handling means for receiving the first pixel data outputted from the switching means or one of the first pixel data and the revised pixel data outputted from the defect pixel repairing means and operating an image process in order to improvement of the image sensor,
   wherein the switching means includes a first switching means controlled by the first control signal and an inverse first control signal in order to transmit the first pixel data to the image signal handling means and a second switching means controlled by the first control signal and the inverse first control signal in order to transmit the first pixel data to the defect pixel repairing means,
   wherein when the first control signal is a logical high, the first switching means is off and the second switching means is on.

2. The image sensor as recited in claim 1, wherein the defect pixel repairing means includes
   a temporary storage means for temporary storing the second control signal;
   a column address detecting means for comparing the second control signal outputted from the temporary storage means with the fourth control signal and generating a sixth control signal showing whether the second control signal is equal to the fourth control signal or not;
   a update controlling means for outputting an next second control signal to the temporary storage means in response to the sixth, the third and the fifth control signals;
   a defect pixel changing means for receiving the surrounding pixel data and generating the revised pixel data;
   a revised pixel selecting means for selectively outputting the revised pixel data or the first pixel data in response to the sixth control signal; and
   a switch outputting means controlled by the first control signal in order to selectively output an output of the revised pixel selecting means.

3. The image sensor as recited in claim 2, wherein defect pixel changing means generates the revised pixel data by using an average of the surrounding pixel data.

4. The image sensor as recited in claim 2, wherein the defect pixel changing means generates the revised pixel data by using one out of the surrounding pixel data except the first pixel data.

5. The image sensor as recited in claim 2, wherein the update controlling means includes
   a first D flip-flop for receiving the third control signal and outputting a current third control signal;
   a second D flip-flop for receiving the current third control signal and outputting a next third control signal;
   a first AND gate for receiving the current third control signal and the next third control signal;
   an OR gate for receiving the current third control signal and an output of the first AND gate;
   a second AND gate for receiving the sixth control signal and an output of the OR gate; and
   a XOR gate for receiving the fifth control signal and an output of the second AND gate and outputting a seventh control signal for updating the second control signal.

6. The image sensor as recited in claim 2, wherein the revised pixel selecting means includes two transmission gates controlled by the sixth control signal or the inverse sixth control signal in order to selectively deliver the first pixel data or the revised pixel data.

7. An image sensor, comprising:
   a storage unit for storing a plurality of pixel data which is transmitted from a pixel array block;
   a switching unit for delivering a first pixel data from the storage unit in response to a first control signal RASS;
   a defect pixel repairing unit which is controlled by the first, a second, a third, a fourth and a fifth control signals in order to receive surrounding pixel data having the first pixel data from the storage unit and the first pixel data from the switching unit and output a revised pixel data by using the first pixel data or the surrounding pixel data; and
   a image signal handling unit for receiving the first pixel data outputted from the switching unit or one of the first pixel data and the revised pixel data outputted from the defect pixel repairing unit and operating an image process in order to improvement of the image sensor,
   wherein the switching unit includes a first switch controlled by the first control signal and an inverse first control signal in order to transmit the first pixel data to the image signal handling unit and a second switch controlled by the first control signal and the inverse first control signal in order to transmit the first pixel data to the defect pixel repairing unit,
   wherein when the first control signal is a logical high, the first switch is off and the second switch is on.

8. The image sensor as recited in claim 7, wherein the defect pixel repairing unit includes
   a temporary storage unit for temporarily storing the second control signal;
   a column address detecting unit for comparing the second control signal outputted from the temporary storage unit with the fourth control signal and generating a sixth control signal showing whether the second control signal is equal to the fourth control signal or not;
   an update controlling unit for outputting a next second control signal to the temporary storage unit in response to the sixth, the third and the fifth control signals;
   a defect pixel changing unit for receiving the surrounding pixel data and generating the revised pixel data;

a revised pixel selecting unit for selectively outputting the revised pixel data or the first pixel data in response to the sixth control signal; and a switch outputting unit controlled by the first control signal in order to selectively output an output of the revised pixel selecting unit.

9. The image sensor as recited in claim 8, wherein the defect pixel changing unit generates the revised pixel data by using an average of the surrounding pixel data.

10. The image sensor as recited in claim 8, wherein the defect pixel changing unit generates the revised pixel data by using one out of the surrounding pixel data except the first pixel data.

11. The image sensor as recited in claim 8, wherein the update controlling unit includes a first D flip-flop for receiving the third control signal and outputting a current third control signal;

a second D flip-flop for receiving the current third control signal and outputting a next third control signal;

a first AND gate for receiving the current third control signal and the next third control signal;

an OR gate for receiving the current third control signal and an output of the first AND gate;

a second AND gate for receiving the sixth control signal and an output of the OR gate; and a XOR gate for receiving the fifth control signal and an output of the second AND gate and outputting a seventh control signal for updating the second control signal.

12. The image sensor as recited in claim 8, wherein the revised pixel selecting unit includes two transmission gates controlled by the sixth control signal or the inverse sixth control signal in order to selectively deliver the first pixel data or the revised pixel data.

* * * * *